March 17, 1931. T. DE BIASE 1,797,052
AUTOMATIC FEEDER FOR GLASS MOLDING MACHINES
Filed June 7, 1928 2 Sheets-Sheet 1

Inventor,
Tancredo De Biase,
Emil Bonnelyche
By Atty.

March 17, 1931. T. DE BIASE 1,797,052
AUTOMATIC FEEDER FOR GLASS MOLDING MACHINES
Filed June 7, 1928  2 Sheets-Sheet 2
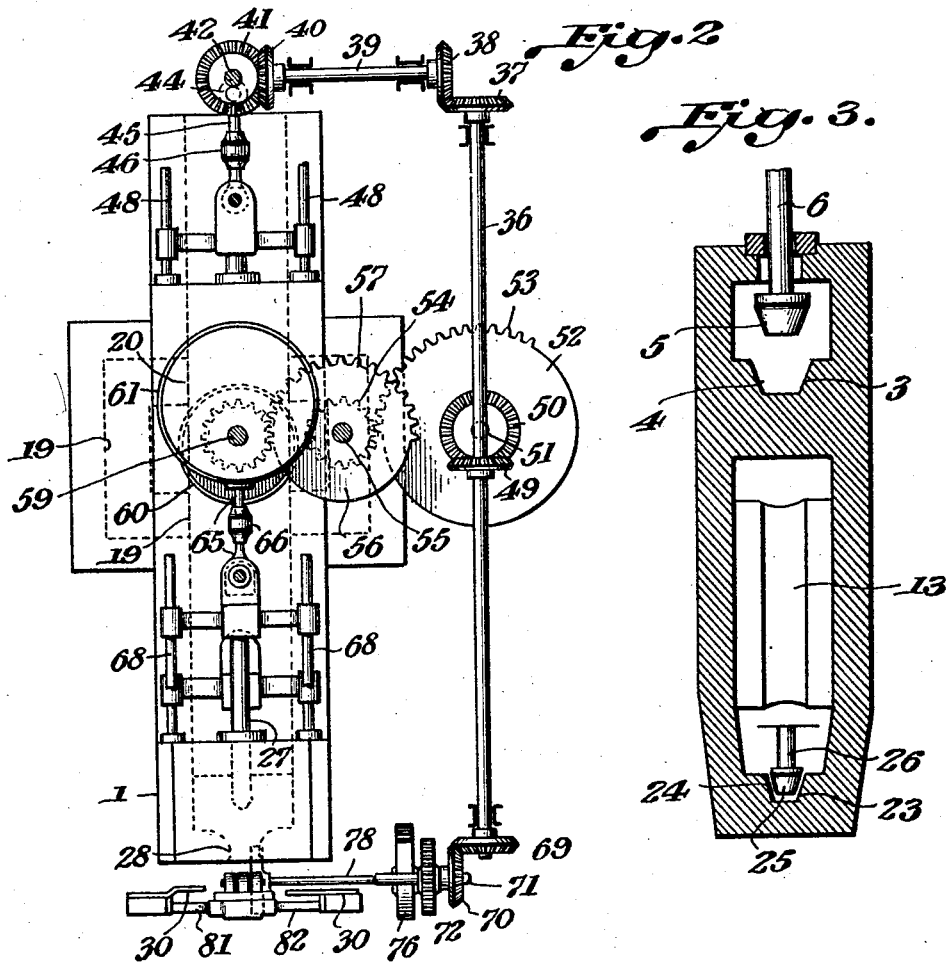
Inventor,
Tancredo De Biase,
By Emil Bönnelycke
Atty.

Patented Mar. 17, 1931

1,797,052

UNITED STATES PATENT OFFICE

TANCREDO DE BIASE, OF BUENOS AIRES, ARGENTINA

AUTOMATIC FEEDER FOR GLASS MOLDING MACHINES

Application filed June 7, 1928, Serial No. 283,686, and in Argentina May 7, 1928.

The present invention refers to improvements in automatic feeders for glass molding machines and its principal object is to provide means for effecting a uniform and regulable feeding with glass at a constant temperature, and other advantages which will be more clearly set forth in the following specification.

In accordance with the invention, the feeder is constituted principally by a front chamber or fore-hearth which can be applied to any melting furnace of the continuous type and in which the melted glass maintains a constant level. From this chamber the glass passes through a gap or opening in a bridge into a small chamber in communication therewith, the latter chamber being provided with an opening wherethrough the glass, by means of the reciprocatory movement of a needle of refractory material, is extruded and passes through a channel into a bowl or basin located underneath and wherein it collects. The glass contained in this bowl passes into a smaller contiguous basin through another bridge which is alternately opened and closed by means of a gate, from which latter basin the glass is extruded in the form of a drop or gob by another needle also moved up and down. When the gob of glass emerges, shears conveniently placed will sever it from the rest of the glass which will be pulled back inside the basin by the needle on its backward movement.

The device is combined with a heating chamber of such a form that the combustion gases rise and keep uniform the temperature of the glass, after which they are exhausted through the chimney with which the fore-hearth or chamber is usually provided.

Besides, all movements of the working elements such as needles, gates and shears, are inter-related or timed and depend exclusively on one main motion. Each of them can be regulated independently so that the amount of glass discharged from the front chamber of the furnace will be equal to that withdrawn from the feeder, and thus the glass level in the bowl will, obviously, be constant, with absolute independence of the glass level in the furnace and front chamber and of the other conditions prevailing thereon which is a great advantage.

In order to show how the invention can be carried into practice, it has been illustrated on the accompanying drawings which show a preferred form.

Fig. 2 is a front view of same,

Fig. 3 is a section on line A—B of Fig. 1, and

Fig. 4 is a plan view of the feeder.

Figure 1:
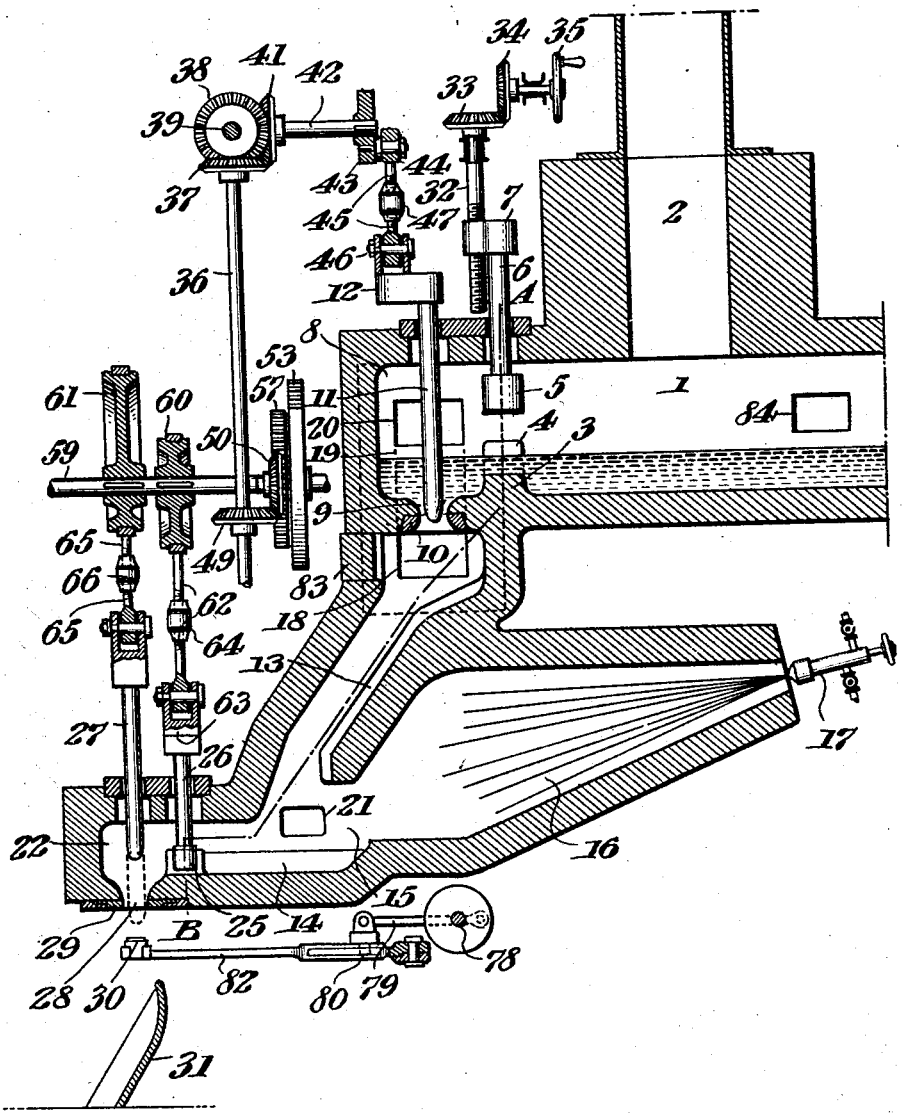
Fig. 1 is a longitudinal sectional view of the improved feeder.

In said drawings, there is indicated at 1, the front chamber or fore-hearth of a suitable glass-melting furnace of the continuous type, provided with a chimney 2. At the outer end of said chamber or hearth there is a bridge 3, having a cut-out part or gap 4 to conformably receive a gate 5 which is located directly above the gap so as to completely close the same and thus obstruct the passage of the glass therethrough. Gate 5 is fixed to a stem 6 provided at the other end with a head 7 from which it receives motion, as will be explained later. The chamber communicates with another chamber 8 which is arranged in front of it and into which the glass normally enters when gate 5 is raised and outlet 9 is closed. The section of the outlet may be varied by removing ring 10 and replacing it by another of different dimensions, such ring being made of refractory material. Inside chamber 8, and through the same, extends a needle 11 provided with a head 12 guided from the outside and capable of being reciprocated vertically, the operation of which will be described later on.

Underneath chamber 8 there is provided a channel 13 which receives the glass passing through outlet 9 and falling by its own weight into a basin or bowl 14 which forms the bottom of chamber 15 and which communicates with another chamber 16, heated by the combustion of liquid or solid fuel by burner 17.

The combustion gases heat the glass stored in basin 14, and then pass through the inlet 18 of a channel 19 which opens at 20 into chamber 8, whence they exhaust into chimney 2, heating also, in this last stage of their circulation, the glass stored in the chamber 1; it is evident then, that by regulating burner 17 it will be possible to maintain the glass at the temperature desired with uniformity. There is a port or vent 21 which serves to cool the glass when overheating has taken place, and which can be used also for inspection.

In communication with chamber 15 there is another chamber 22 located in front thereof, intersected by a partition wall or bridge similar to bridge 3, provided with an opening or gap 24 through which passes the glass coming from basin 14; this gap is closed and opened by a gate 25 of refractory material which is raised and lowered by stem 26, operated by an eccentric, as will be seen. The small chamber 22 is traversed by a needle or plunger 27 of refractory material having a reciprocating movement with the object of forcing the glass contained in said chamber to pass through outlet 28 when the needle descends; the size of said outlet being altered by changing plate 29.

Underneath outlet 28 is arranged a pair of shears 30 which close at the proper moment in order to sever the drop or gob of glass extruded by needle 27. The glass drop may fall directly to a tool or molding machine or else into a guide 31 to be conducted thereto.

*Operation.*—Gate 5 is only moved at the beginning or end of work, and its operation is effected by hand by means of a screw 32 in threaded engagement with head 7 and provided at its top with a pinion 33, meshing with another pinion 34, which is rotated by a handle 35. As will be understood, the motion of the handle in one or the other direction will cause the screw to move gate 5 upward or downward.

The other moving elements of the feeder, i. e., needle 11, gate 25, needle 27 and shears 20, have their movements timed relatively to one another and all obtained from the main shaft 36, the number of revolutions of which is equal to the number of drops or gobs to be extruded. The movement of needle 11 is produced by means of a gear 37 mounted on the end of shaft 36; said gear meshing with a similar gear 38 on one end of shaft 39, the other end of which is provided with a gear 40 meshing with a similar gear 41 on shaft 42. The latter carries a disk 43 connected by a crank pin 44 to an adjustable link, the component members 45 of which are adjustably connected by a turn-buckle coupling 47; such arrangement enabling needle 11 to be moved toward or from outlet 9. The head 12 of the needle is pivotally connected at 46 to the lower end of the link and is guided in its movements by suitable guide rods 48.

On shaft 36 is fixed another pinion 49 meshing with a similar pinion 50 on shaft 51, the latter being provided with a disk 52 having a toothed portion 53 comprising the same number of teeth as a pinion 54 with which it meshes, and mounted on a shaft 55 that carries another disk 56 also partially toothed as at 57, disk 56 having the same number of teeth as a pinion 58 with which it meshes. This pinion 58 is mounted on shaft 59 to which are keyed eccentrics 60 and 61 designed to control gate 25 and needle 27, respectively, which are disposed at a convenient relative angular displacement.

The transmission of motion to the gate is effected by means of a two-part link 62, the members of which are coupled adjustably by a turn-buckle coupling 64, said link being connected at one end to the strap of eccentric 60 and at the other end to the head 63 of stem 26. The transmission of motion to needle 27 is an analogous to the foregoing, and is effected by a similar two-part link 65 equipped by a turn-buckle coupling 66. The movements of the gate and the needle are guided by rods 67 and 68.

As will be obvious, the rotation of shaft 59 is intermittent, owing to the presence of the partially-toothed disks 52 and 56 and their associated pinions 54 and 58; but these will only be used when the number of glass drops or gobs required for a definite period of time is small, since for larger numbers the eccentrics will have to work continuously.

The shears accomplish their work as follows: on the vertical drive shaft 36 is fixed a pinion 69 meshing with a similar pinion 70 on a short shaft 71 provided with a pinion 72 which transmits its rotation through an intermediate gear 73 to another pinion 74 on a short shaft 75 whereon is mounted a partially-toothed gear 76 coacting with a pinion 77 on shaft 78. Said shaft 78 has a crank connection 79 with a member carrying a pair of pivots 80 which are operatively connected, in turn, with arms 81 and 82 that carry the shear blades 30, forcing them, at each revolution of pinion 77, to open and close in order to sever the drop or gob extruded from outlet 28.

At 83 is indicated a door that serves to permit replacing of ring 10 and can be, at the same time, used for inspection; vent or window 84 can also be used for this purpose.

It is evident that changes in details and construction can be introduced without departing from the scope of the invention.

I claim as my invention:

1. In a continuous glass-melting furnace, a fore-hearth to receive molten glass from the melting chamber of the furnace and provided with an outlet; a chamber below the hearth and provided with a bowl; a channel leading from said outlet to said bowl; a discharge chamber communicating with the bowl and having an outlet from which the glass is discharged to the molds; a plunger associated with each outlet to control the passage of glass therethrough; a drive shaft; and gear connections between said shaft and the two plungers for operating them in timed relation.

2. A glass furnace according to claim 1, in which a pair of shears is arranged below the outlet of the discharge chamber to sever a gob of glass extruded therethrough by the associated plunger; and in which an additional gear connection is provided between the drive shaft and the shears for operating the latter from the former.

3. A glass furnace, comprising a fore-hearth to receive molten glass from the melting chamber of the furnace; a chamber below and communicating with the hearth and provided with a bowl to receive glass therefrom; said hearth having an outlet communicating with the bowl chamber, and a plunger to control the flow of glass through said outlet; a discharge chamber communicating with the bowl and having an outlet from which the glass is discharged to the molds; a plunger associated with the second-named outlet to control the passage of glass therethrough; a movable gate to control the passage of glass from the bowl to the discharge chamber; means for operating the second-named plunger and the gate in timed relation; a main drive shaft for controlling said operating means; and a separate operating connection leading from said shaft to the plunger associated with the hearth.

4. A glass furnace, comprising a fore-hearth to receive molten glass from the melting chamber of the furnace; a chamber below and communicating with the hearth and provided with a bowl to receive glass therefrom; a discharge chamber communicating with the bowl and having an outlet from which the glass is discharged to the molds; a plunger associated with said outlet to control the passage of glass therethrough; a movable gate to control the passage of glass from the bowl to the discharge chamber; an operating shaft; a pair of eccentrics mounted thereon arranged in angularly-offset relation; an operating connection between one eccentric and the plunger; and a second operating connection between the other eccentric and the gate.

5. A glass furnace according to claim 4, in which the fore-hearth has an outlet in communication with the bowl chamber, and a plunger to control the flow of glass therethrough; and in which the eccentric shaft is rotated by a main drive shaft having a separate operating connection leading to the plunger associated with the hearth.

In testimony whereof I affix my signature.

TANCREDO DE BIASE.